(12) United States Patent
Chen et al.

(10) Patent No.: US 7,705,721 B1
(45) Date of Patent: Apr. 27, 2010

(54) APPARATUS AND METHOD FOR SENSING AND RESPONDING TO ENVIRONMENTAL CONDITIONS OF A COMPUTER SYSTEM AT NON-UNIFORM POLLING INTERVALS

(75) Inventors: Chih-Yi Chen, Sunnyvale, CA (US); Mitalee Gujar, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 411 days.

(21) Appl. No.: 11/717,340

(22) Filed: Mar. 13, 2007

(51) Int. Cl.
*G08B 26/00* (2006.01)

(52) U.S. Cl. ............... 340/518; 340/539.27; 714/47
(58) Field of Classification Search ............... 340/518, 340/539.27, 286.01; 714/47
See application file for complete search history.

(56) References Cited

U.S. PATENT DOCUMENTS

| | | | | |
|---|---|---|---|---|
| 4,823,290 A * | 4/1989 | Fasack et al. | ......... | 340/825.01 |
| 5,056,092 A * | 10/1991 | Bruner | ......... | 714/24 |
| 5,333,676 A * | 8/1994 | Mizuno | ......... | 165/294 |
| 5,337,413 A * | 8/1994 | Lui et al. | ......... | 710/2 |
| 5,590,061 A * | 12/1996 | Hollowell et al. | ......... | 702/130 |
| 5,878,377 A * | 3/1999 | Hamilton et al. | ......... | 702/132 |
| 6,345,369 B1 * | 2/2002 | Kitamorn et al. | ......... | 714/14 |
| 6,927,961 B2 * | 8/2005 | Schestak | ......... | 361/103 |
| 7,103,761 B2 * | 9/2006 | Larson et al. | ......... | 713/1 |
| 7,386,737 B2 * | 6/2008 | Finkelstein et al. | ......... | 713/300 |
| 2005/0024826 A1 * | 2/2005 | Bash et al. | ......... | 361/695 |
| 2006/0010353 A1 * | 1/2006 | Haugh | ......... | 714/47 |
| 2006/0155517 A1 * | 7/2006 | Dobbs et al. | ......... | 702/188 |

* cited by examiner

*Primary Examiner*—Eric M Blount
(74) *Attorney, Agent, or Firm*—John R. Ley (57) ABSTRACT

Environmental sensors are distributed in a computer system to sense environmental conditions, and the sensors are polled at polling intervals which are adjusted in response to changing environmental conditions, thus allowing deteriorating or improving conditions to be recognized and monitored more or less closely as desired.

38 Claims, 6 Drawing Sheets

APPARATUS AND METHOD FOR SENSING AND RESPONDING TO ENVIRONMENTAL CONDITIONS OF A COMPUTER SYSTEM AT NON-UNIFORM POLLING INTERVALS

This invention relates to sensing and responding to environmental conditions within a computer system, and more specifically, to a new and improved apparatus and method for obtaining measurements from a plurality of environmental sensors at time intervals appropriate to conditions sensed, and taking actions in response to undesirable conditions which might threaten the operation or performance of the computer system.

BACKGROUND OF THE INVENTION

Environmental sensors are an important component in modern computer systems, especially high-end servers for commercial and enterprise operations in which reliability is of extreme importance. The environmental sensors are positioned within a computer system to detect environmental conditions that can adversely affect the operation or performance of the computer system. The most common environmental sensors measure temperatures of certain components or at specific locations within the computer system, especially for those components or locations where a large amount of heat is generated or the operation of the system component is relatively sensitive to temperature. Examples of other environmental sensors within the computer system include voltage sensors to sense unacceptable voltages, and fan speed sensors to ensure adequate airflow for cooling.

Heat is generated as a result of conducting electrical currents within various electrical components including semiconductor integrated circuits (ICs), power supplies and other internal components. The amount of heat generated depends upon the type of component and the amount and frequency of current it conducts. A central processing unit (CPU) generates considerable heat because of its constant, very high frequency operation. A power supply, which converts conventional commercial alternating current (AC) power to direct current (DC) power used by the computer components, is usually another significant source of heat. Other components, such as memory ICs, generate relatively moderate amounts of heat due to the more intermittent nature of the electrical currents they conduct. Other components, such as a motherboard which retains many of the significant ICs used in the computer and the temperature sensors associated with them generally represent the overall temperature of multiple grouped components. Other sensors, such as ambient air sensors located on a front panel or backplane of the computer measure the temperature of the ambient air which cools the computer system. An increased temperature of the ambient air diminishes the cooling capacity.

Due to the variable amounts of heat that are generated from the different system components, each component within the computer system that is vital to its continued operation and reliability possesses a dedicated temperature sensor to monitor the temperature or condition of that component. In the event that any of the temperature sensors detects a temperature or condition which exceeds a temperature or condition threshold, the computer system can take the appropriate preventive or remedial action. Each of the environmental sensors produces environmental sensor signals which characterize the current status of the environmental condition sensed by the environmental sensor. The computer system responds to the environmental sensor signals and manages any adverse environmental condition indicated by the environmental sensor signals. Typical responses include logging changing environmental conditions, producing and displaying warning messages about the environmental conditions, and shutting down or turning off the computer system or some portion of it when the environmental condition threatens operation or performance.

A primary consideration for sensing environmental conditions is the technique of supplying signals from the environmental sensors to a central processing unit (CPU) or processor of the computer system which then evaluates the sensor signals and responses to be taken. In one scenario, the environmental sensors continuously provide sensor signals to the processor, but such an approach unduly wastes computational resources. In an alternative scenario in which computational resources are conserved, the environmental sensors provide the sensor signals to the processor intermittently. Two ways of intermittently supplying the sensor signals to the processor are an interrupt routine and a polling routine.

An interrupt routine involves continuously sensing the environmental conditions by the environmental sensors, but the sensor signals are not sent to the processor until they exceed a predetermined threshold which indicates a potentially threatening condition. The computations by the processor are then interrupted and an interrupt service routine is executed to interrogate the environmental sensor, receive the environmental sensor signal, and take an appropriate response.

Because the interrupt routine is event driven, it does not involve transmitting the sensor signals unless a threshold event is detected. In this manner, the interrupt routine conserves computational resources because other processor operations are not delayed unless a potentially threatening condition is detected. However, the interrupt routine requires special hardware, such as separate dedicated interrupt conductors directly connecting each sensor to the processor and threshold determination circuits associated with each environmental sensor to establish the condition under which the interrupt signal is delivered to the processor. Additional conductors linking the environmental condition sensors and the processor are usually difficult and expensive to produce on motherboards where space and connectivity is at a premium.

A polling routine involves continuous sensing of the environmental conditions by the environmental sensors and repetitively "polling" or interrogating and receiving the sensor signals back from the interrogated environmental sensors at a set polling time interval (or polling interval). The polling is conducted over a communication bus which links most of the IC components of the computer system, so no additional conductors are required. Comparing the sensor signals to threshold values is easily accomplished by the processor executed software, thereby eliminating the costs for separate threshold determination circuits associated with each environmental sensor. Initiating an appropriate response is easily integrated with other software controlled actions.

The polling routine is a time interval based routine which occurs repeatedly with a set periodicity regardless of whether or not an adverse condition is detected by the sensor. The polling routine can beneficially provide advanced warning of adverse conditions by monitoring the trends associated with the sensor signals in advance of the actual occurrence of the adverse event. However, the polling routine is inefficient at conserving system resources because of the repetitive nature of the continuous polling of all the sensors.

Many sensed environmental conditions have the potential of changing very quickly and thereby very quickly adversely affecting or threatening the computer system. For example, if a cooling fan on the processor stops operating, or if a heat sink connected to the processor becomes disconnected, the temperature of the processor can rapidly increase to a dangerous level. On the other hand, the ambient air used for cooling the computer system generally does not rapidly increase in temperature. However, the polling routine must be established with a relatively short polling interval to accommodate the critical components having the potential for rapid change, and will inherently consume extra computational resources in the inefficient and needless polling of the less critical environmental sensors at the same high frequency as the more critical components.

SUMMARY OF THE INVENTION

The present invention effectively and efficiently monitors environmental conditions within a computer system, and by doing so, quickly recognizes any environmental condition which may threaten the proper operation of the computer system. Effective and efficient monitoring occurs by polling a plurality of environmental sensors within the computer system at different polling intervals, and dynamically adjusting the polling intervals for the different environmental sensors in response to the conditions sensed by the sensors. The polling intervals for each environmental sensor are based upon the characteristics or importance of the environmental condition sensed, and the polling intervals are altered to either increase or decrease the polling interval for the respective environmental sensor according to its response to the environmental conditions. Decreasing the polling interval occurs when an environmental condition is deteriorating and the operation or performance of the computer system is threatened. Conversely, increasing the polling interval occurs when an environmental condition is not deteriorating or threatening the operation or performance of the computer system. Varying the polling interval allows the different environmental conditions to be monitored more closely according to their sensitivity or trend, and corrective or preventive measures can be taken in advance of a serious or threatening condition. Consequently, computational resources are more efficiently used by focusing those resources more on monitoring conditions of critical environmental sensors and less on monitoring conditions of less potentially-affected environmental sensors, and dynamically adjusting the application of those computational resources according to the responses of the sensors to the environmental conditions.

In accordance with these and other features, one aspect of the invention involves both a computer system and a method for sensing environmental conditions within the computer system. A plurality of environmental sensors are distributed at locations throughout the computer system, and the plurality of environmental sensors sense various environmental conditions within the computer system. Polling the environmental sensors generates environmental sensor signals. The environmental sensors each have a respective polling interval, and the polling intervals for at least two of the environmental sensors are unequal to each other. Upon one of the sensors detecting a changing environmental condition, the polling time for the sensor is adjusted accordingly. If the environmental sensor detects a deteriorating environmental condition, the polling interval is decreased to allow the condition to be monitored more closely. Alternatively, if the environmental sensor detects an improving environmental condition, the polling interval is increased to conserve computer resources and only poll the environmental sensor as much as is necessary.

More detailed aspects of the invention invoke establishing a polling interval for each of the environmental sensors by establishing absolute polling times for each of the environmental sensors using the current time and the polling intervals. The earliest absolute polling time is identified among the collection of absolute polling times for all of the sensors, and polling the environmental sensors with the earliest absolute polling time. Each sensor signal generated is compared to a threshold to determine whether the environmental condition sensed warrants increasing or decreasing of the polling interval for the respective environmental sensor. Environmental condition responses, which serve to protect the computer system and remedy a deteriorating environmental condition, can also be executed in response to the comparison of the environmental sensor signal and its respective threshold.

A more complete appreciation of the present disclosure and its scope, and the manner in which it achieves the above and other improvements, can be obtained by reference to the following detailed description of presently preferred embodiments taken in connection with the accompanying drawings, which are briefly summarized below, and the appended claims.

DETAILED DESCRIPTION

Figure 1:
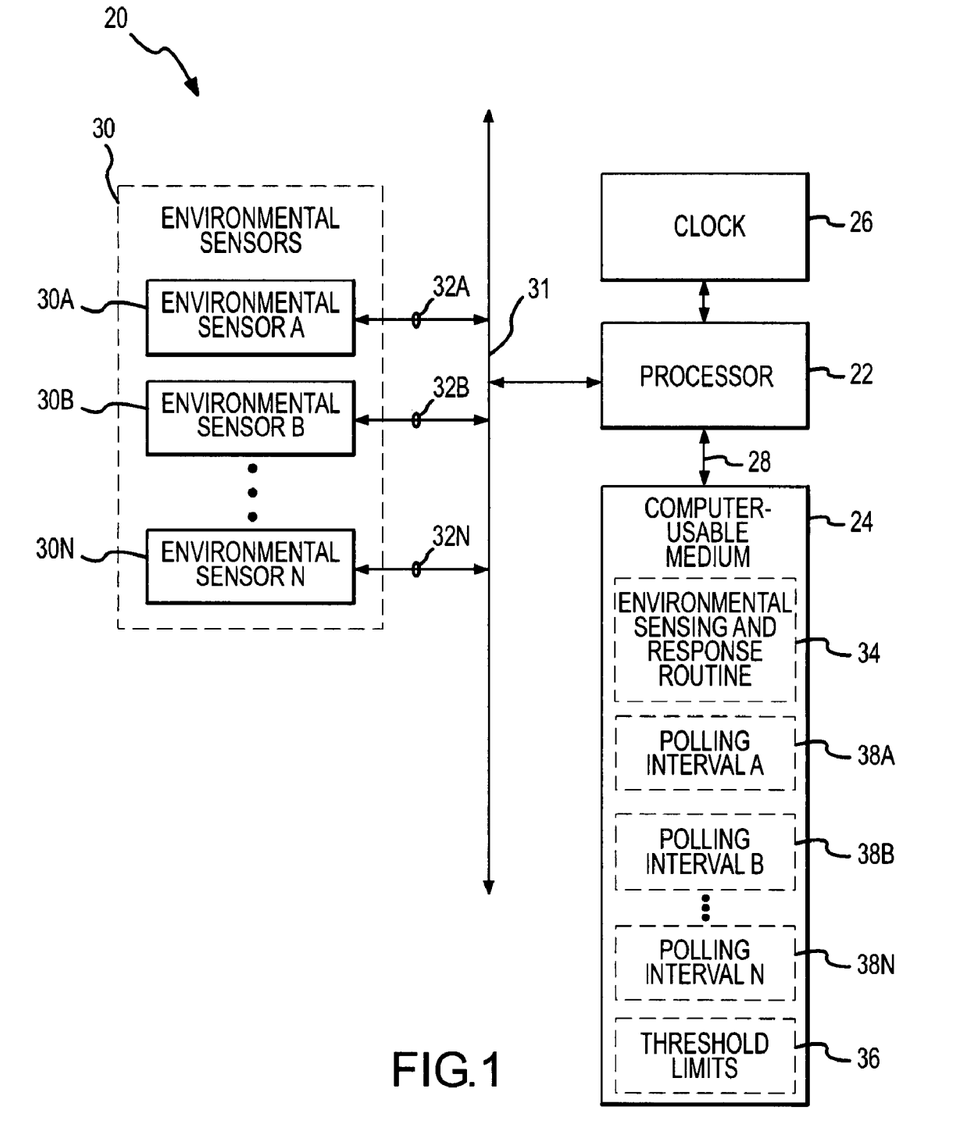
FIG. 1 is a block diagram of a basic computer system which incorporates the present invention.
Figure 9:
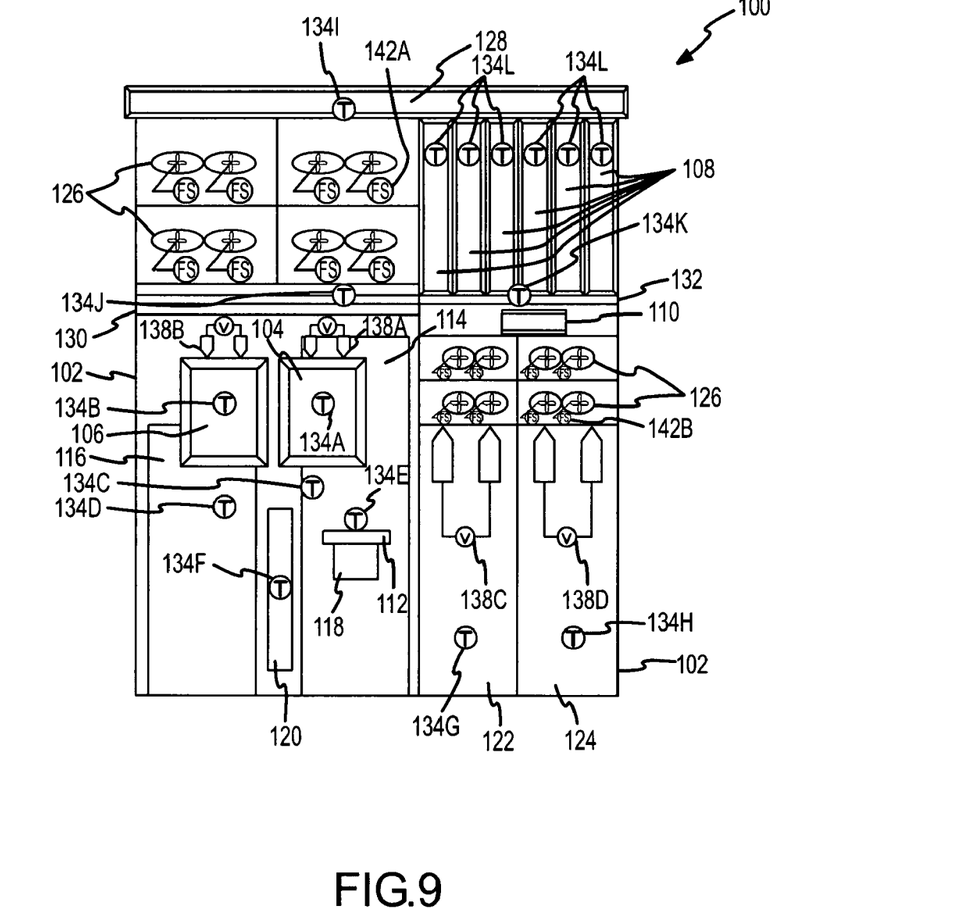
FIG. 9 is a generalized illustration of a network storage server, which includes various temperature, voltage, and fan speed sensors and which incorporates the present invention.
Figure 10:
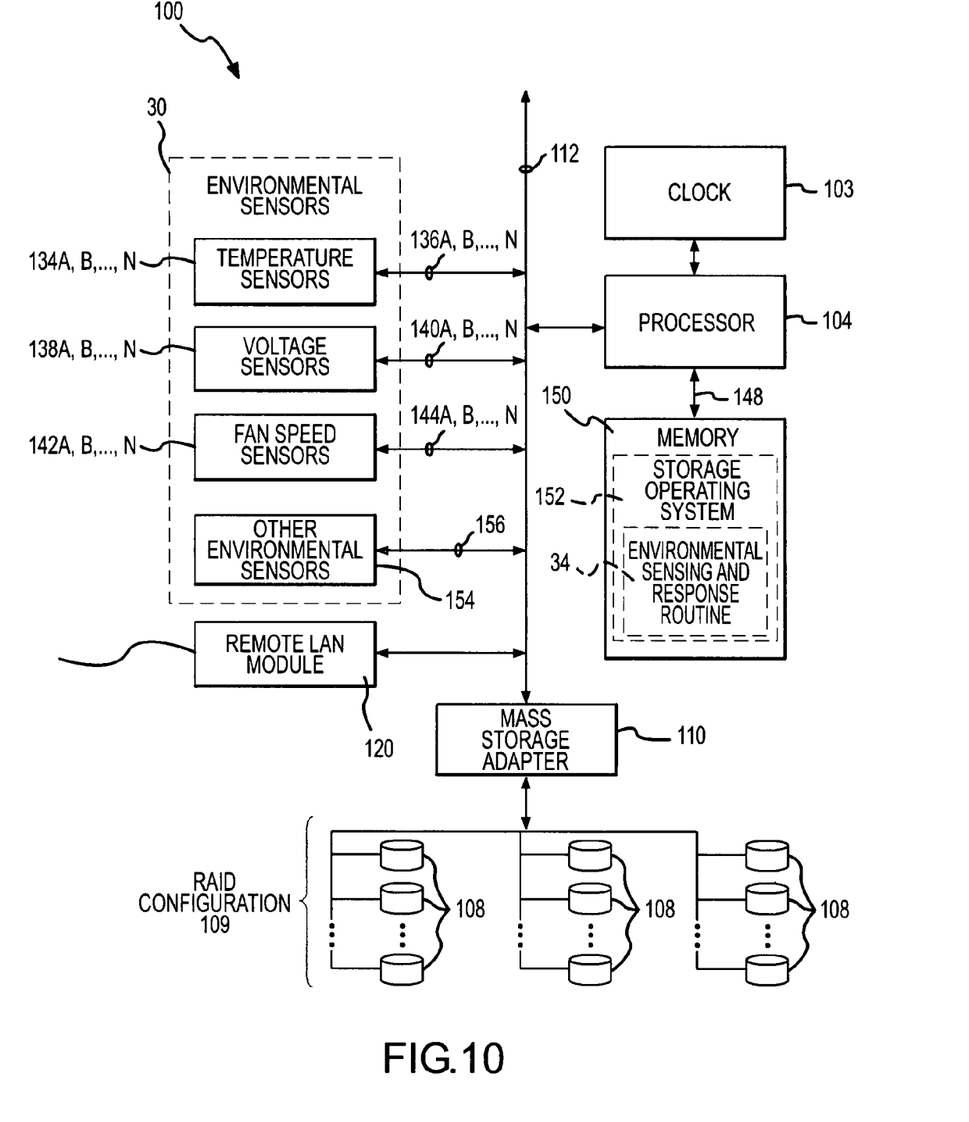
FIG. 10 is a block diagram of the basic components of the network storage server shown in FIG. 9, which further illustrates incorporation of the present invention.

The basic components of a generalized computer system 20 to which the present invention pertains are shown in FIG. 1. Typically, the computer system to which the present invention is applied will be considerably more complex in the number and interconnection of components than the computer system 20 shown in FIG. 1. For example, a useful application of the present invention is in a network storage server 100 (FIGS. 9 and 10).

The present invention, exemplified by the general computer system 20, preferably uses a conventional central processing unit (CPU) or processor 22, a computer-usable medium 24, and a clock 26. The computer-usable medium 24, such as conventional memory, possesses data storage capabilities that can be used by the computer system 20 for the execution of programmed code stored in the computer-usable medium 24. The processor 22 accesses the computer-usable medium 24 through a system bus 28.

A plurality of environmental sensors 30, which are individually depicted as environmental sensors 30A, 30B to 30N, are each connected to the processor 22 through a management bus 31. The environmental sensors 30 are physically distributed throughout the computer system 20 and associated with one or more individual components of the computer system 20. Each of the environmental sensors 30A-30N senses an environmental condition of the component with which the sensor is associated, and each sensor 30A-30N supplies an environmental sensor signal 32A-32N, respectively, related to the environmental condition sensed. Temperature is one environmental condition which warrants close monitoring through the environmental sensors, although other environmental conditions or functions associated with the operation of the computer system 20 might also be monitored. The environmental sensors 30 which sense temperature can be distributed within the computer system 20 to sense the temperature of such components as the processor 22, and other components typical of a more complex computer system such as the network storage server 100 (FIGS. 9 and 10). Thus, for example, the sensor 30A may be associated with the processor 22 for the purpose of sensing its temperature, the sensor 30B may be associated with the motherboard for sensing its temperature, and other sensors may be associated with the power supply for sensing its temperature and voltage, while still other sensors may sense the fan speed of cooling fans within an enclosure for the computer system, all of which is described in greater detail in conjunction with the network storage server 100 (FIGS. 9 and 10). The remaining environmental sensors 30 can be used to sense other environmental conditions and components as required to protect the computer system 20.

The environmental sensor signals 32A-32N are communicated to the processor 22 through the bus 28 in response to the processor 22 executing a sensing and response routine 34 which is implemented as the program code stored in the medium 24. Executing the sensing and response routine 34 for each sensor involves the processor 22 sending a query signal over the bus 28 to the environmental sensors 30, such as environmental sensor 30A. The query signal is sent by the processor 22 to fetch the reading of the environmental sensor that receives the query signal. Upon receiving the query signal, the queried environmental sensor responds by delivering the environmental sensor signal, for example signal 32A, back to the processor 22. Polling occurs only when the processor 22 executes the sensing and response routine 34. By successively polling the environmental sensors through the sensing and response routine 34, the processor 22 ultimately receives each of the environmental sensor signals 32A-32N from each of the environmental sensors 30A-30N.

Within the sensing and response routine 34, each of the environmental sensor signals 32A-32N are compared with sensor threshold limits 36 which are stored within the computer-usable medium 24. The environmental sensor signals 32A-32N can be compared to more than one threshold limit. Upon comparing the environmental sensor signals 32A-32N with the threshold limits 36, the processor 22 detects any environmental condition which may threaten the operation or performance of the computer system 20. Thereafter, the processor 22 takes corrective or preventive environmental condition response actions to address the environmental condition that may be threatening the operation or performance of the computer system. Exemplary environmental condition response actions include logging changing environmental conditions, producing and displaying a warning messages about the environmental conditions, turning on system alert signals such as light emitting diodes (LEDs) associated with the computer system, and shutting down or turning off the computer system or some portion within it when the environmental condition threatens operation or performance, among others.

Each of the environmental sensors 30A-30N is polled at corresponding polling intervals 38A-38N which are of appropriate time for the respective environmental condition sensed. Longer time intervals between successive polls are used for any of the environmental sensors 30 which monitor environmental conditions which are associated with less critical elements within the computer system 20, or which sense environmental conditions that can change relatively slowly. Shorter time intervals between successive polls are used for any of the environmental sensors 30 associated with more critical elements, or which sense environmental conditions that can change rapidly. The processor 22 is an example of a critical element because the proper functioning of the computer system 20 relies upon proper functionality of the processor. In addition, the processor 22 is susceptible to rapid temperature increases with respect to other computer components due to the relatively high amount of electrical power consumed by the processor 22. In contrast, a fan is an example of a less critical element whose failure will not immediately impact the operation of the computer system 20, particularly because other redundant fans may circulate enough cooling air within the computer system 20 for prolonged operation.

Various and different considerations may determine the appropriate polling interval at which any of the environmental sensors 30 are polled. For example, when the failure of a redundant element within the computer system is not catastrophic, the measurement of the environmental condition for the redundant element is not as critical as for other non-redundant elements. Consequently, redundant elements within the system usually possess larger polling intervals.

Another consideration for determining the appropriate polling interval involves the failure of non-critical environmental sensors which sense the conditions of non-critical elements. Upon the computer system 20 detecting the failure of a non-critical sensor, the polling of the failed environmental sensor is eliminated (i.e., the polling interval made infinitely long), at least on a short-term basis, so that resources are not unnecessarily devoted to polling a malfunctioning sensor. Non-critical environmental sensors include environmental sensors of redundant elements, environmental sensors with long polling intervals, environmental sensors which are less susceptible to rapid environmental changes, or environmental sensors that sense environmental conditions which are reasonably interpretable or related to an environmental condition sensed by some other sensor (e.g., changes in the temperature of passive elements within the computer system may be reflected by changes in the inlet cooling air temperature). Of course, under such circumstances and appropriate warning would be given indicating the failure of the environmental sensor, to allow human determination of the level of importance of that sensor. Regardless of the factors which are used to determine the time interval of polling for each of the environmental sensors 30A-30N, the primary consideration in establishing polling intervals is to balance the rapid polling of each environmental sensor against an inefficient consumption of computer resources.

The sensing and response routine 34 can also vary the polling interval for each of the environmental sensors 30A-30N as the deterioration or improvement of the corresponding environmental condition may warrant. When an environmental condition sensed by one of the environmental sensors 30 is deteriorating, the sensing and response routine 34 can increase monitoring of the environmental condition by decreasing the polling interval at which the processor 22 polls the corresponding environmental sensor. Decreasing the polling interval supplies each environmental sensor signal to the processor 22 more rapidly, thereby allowing the processor 22 to take preventive or corrective responsive actions more rapidly as the environmental condition may require. Alternatively, when the environmental condition improves and no longer threatens the operation or performance of the computer system 20, the sensing and response routine 34 can increase the time interval at which the processor 22 polls the environmental sensor and receives the environmental sensor signal. Increasing the polling interval conserves computer resources as all of the environmental sensors are not needlessly polled, thereby allowing the computational resources of the processor 22 to be applied for other purposes.

Figure 2:
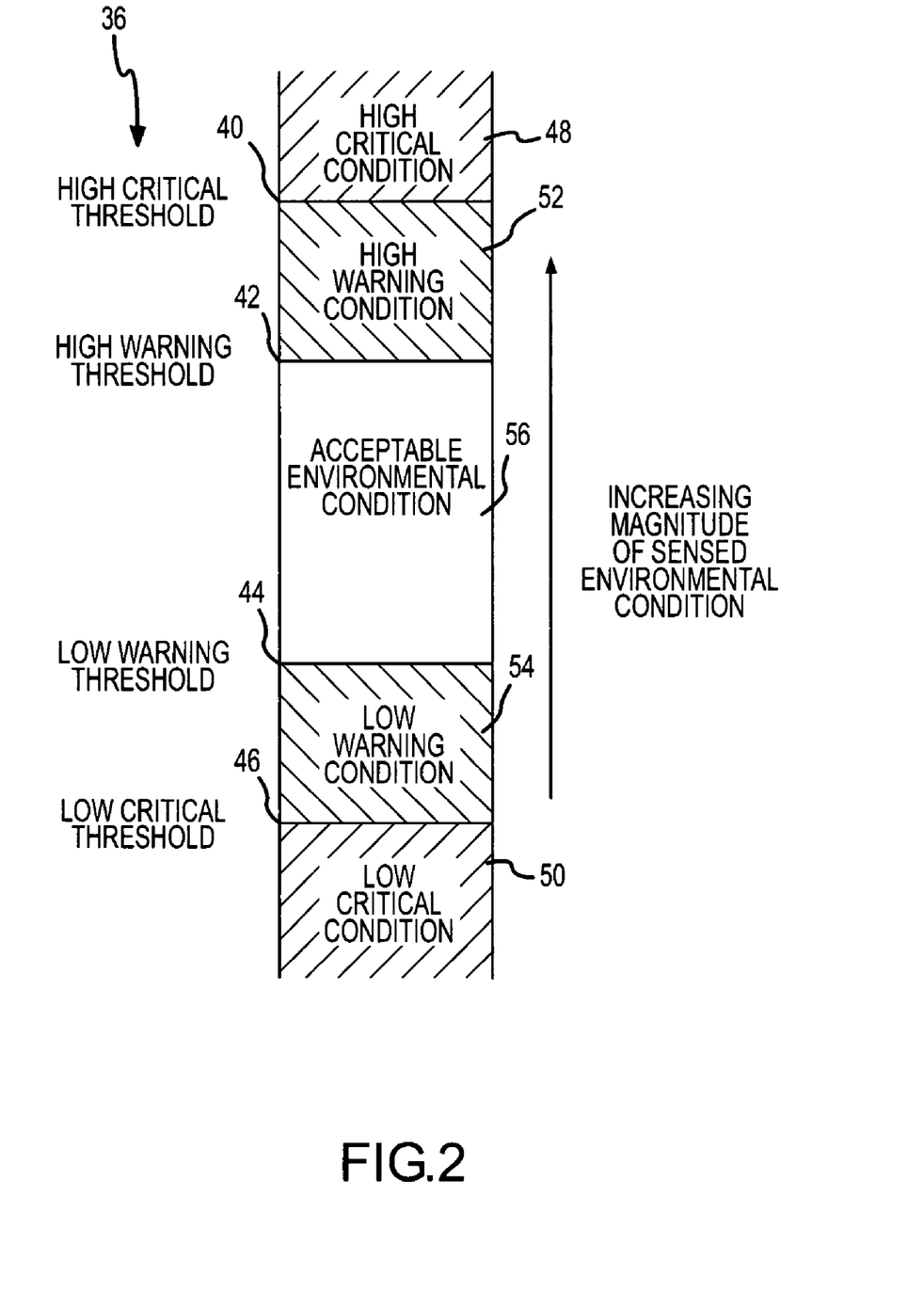
FIG. 2 is a graphical illustration sensor environmental condition threshold limits recorded in a memory of the computer system shown in FIG. 1, and also illustrating states relative to the threshold limits.

The sensor threshold limits 36, as shown in FIG. 2, determine when the sensing and response routine 34 alters the polling intervals due to changing environmental conditions. Stored within the computer-usable medium 24 (FIG. 1) for each sensor are four sensor threshold limits 36, comprising a high critical threshold 40, a high warning threshold 42, a low warning threshold 44, and a low critical threshold 46. Acting in conjunction with each other, the threshold limits 36 define states of environmental conditions. When the magnitude of an environmental sensor signal is greater than the high critical threshold 40, the corresponding environmental condition exists as a high critical condition 48. Under this circumstance, the environmental condition poses a significant threat to the operation or performance of the component of the computer system operating under this environmental condition, and the sensing and response routine 34 consequently decreases the polling interval for the environmental sensor so polling occurs more rapidly. Similarly, when the magnitude of the environmental sensor signal is less than the low critical threshold 46, a low critical condition 50 exists. Again, under this circumstance the operation or performance of the component is threatened, and the sensing and response routine 34 consequently decreases the polling interval so the polling occurs more rapidly.

A high warning condition 52 is defined as the condition between the high critical and the high warning thresholds 40 and 42, and a low warning condition 54 is defined as the condition between the low critical and the low warning thresholds 44 and 46. When the magnitude of an environmental sensor signal is less than the high critical threshold 40 and greater than the high warning threshold 42, the environmental condition exists as the high warning condition 52. Under this circumstance, the environmental condition poses a slight or moderate threat to the operation or performance of the component. The continued deterioration of the environmental condition leads to a more significant threat, or alternatively the improvement of the environmental condition leads to elimination of the threat. The high warning condition 52 requires closer monitoring, and the polling interval for the environmental sensor is decreased, but not as much as the decrease for the high critical condition 48. Similarly, the polling interval is decreased when the magnitude of one of the environmental sensor signals is between the low critical threshold 46 and the low warning threshold 44, as the environmental sensor senses the low warning condition 54.

The high warning and low warning thresholds 42 and 44 define an acceptable environmental condition 56. An acceptable environmental condition 56 exists when the magnitude of one of the environmental sensor signals is less than the high warning threshold 42 and greater than the low warning threshold 44. Under this circumstance, the operation or the performance of the corresponding component is not threatened, and the processor 22 (FIG. 1) polls the environmental sensor more slowly with the greatest polling interval that is acceptable given the considerations as previously explained. Finally, although FIG. 2 illustrates the use of the four specific threshold limits 40, 42, 44, and 46, more or less threshold limits may be employed and stored as sensor threshold limits 36 in the computer-usable medium 24 (FIG. 1). A greater or lesser number of threshold limits may be desired or required in consideration of the environmental condition being sensed. The number of threshold limits may also be different for each environmental sensor.

Figure 3:
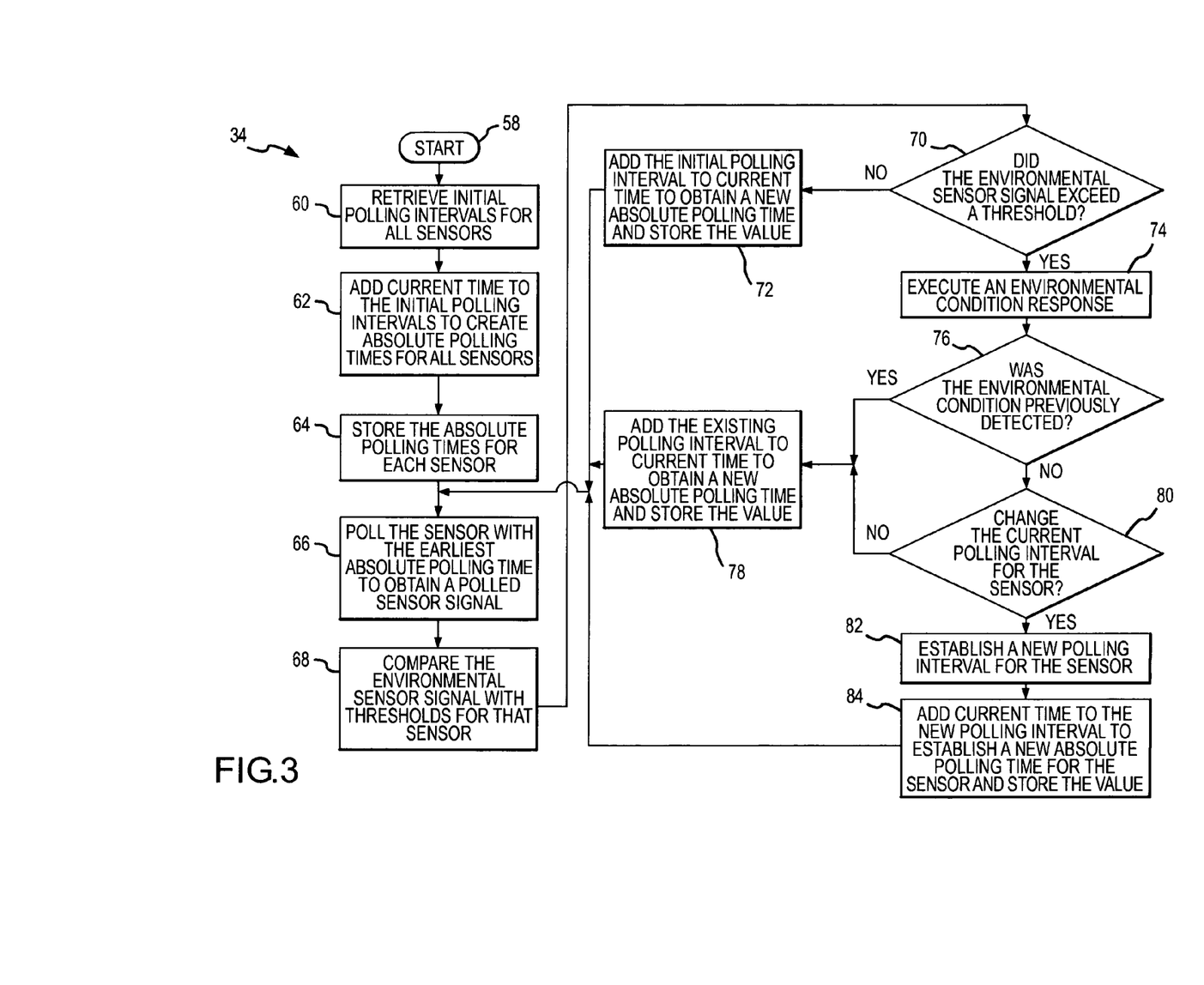
FIG. 3 is a flowchart showing details of an environmental sensing and response routine executed by the computer system shown in FIG. 1.

The sensing and response routine 34 executed by the processor 22 (FIG. 1) is shown in greater detail in FIG. 3. The sensing and response routine 34 is initiated at 58, and initial polling intervals which have previously been stored within the computer-usable medium 24 (FIG. 1) for each of the environmental sensors 30A-30N (FIG. 1) are retrieved at 62. The polling intervals assigned to each of the environmental sensors 30A-30N determine the amount of time that lapses between successive polls of that environmental sensor by the processor 22 (FIG. 1). The assignment of the individual polling intervals conserves computer resources as the environmental sensors are polled only at the time intervals which are appropriate for each of the environmental sensors and their accompanying environmental conditions. The initial polling interval retrieved at 60 is the interval at which the processor polls an environmental sensor under an acceptable environmental condition. As discussed in greater detail below, the initial polling interval of the environmental sensor is decreased upon the deterioration of the sensed environmental condition.

The current time is added to each of the initial polling intervals at 62 to create a series of absolute polling times for each of the environmental sensors. The absolute polling times give the time at which the processor polls each of the environmental sensors. However, the series of absolute polling times does not necessarily give the specific ordering of the polling of the environmental sensors. When a polling interval of one of the environmental sensors is much smaller than that of another environmental sensor, the former environmental sensor will be polled multiple times before first polling the other environmental sensor.

The series of absolute polling times are stored within the computer-usable medium 24 (FIG. 1) at 64. The processor assesses which environmental sensor is to be polled next by referencing the stored absolute polling times and determining which of the environmental sensors has the earliest absolute polling time. Upon the current time reaching the earliest absolute polling time, the processor polls the corresponding environmental sensor at 66. On the occasion where two or more environmental sensors are associated with the earliest absolute polling time, the processor polls each of the environmental sensors in succession on a nearly simultaneous basis.

After polling the environmental sensor with the earliest absolute polling time, the processor receives the resulting environmental sensor signal and compares it with the associated environmental sensor thresholds at 68. The number of thresholds compared to the environmental sensor signal is determined by the number of threshold limits established for the environmental sensor. For example, the environmental sensor signal can be compared to each of the four threshold limits shown in FIG. 2. However, if the environmental sensor is compared to multiple threshold limits, occasions arise in which not all of the threshold limits need be compared to the sensor signal. To further demonstrate using the four threshold limits shown in FIG. 2, if the environmental sensor signal exceeds the high critical threshold 40, then the other threshold limits need not be compared as the environmental condition has been properly characterized and the further comparisons to the remaining threshold limits does not add to the characterization.

A determination at 70 evaluates whether the environmental sensor signal exceeds any one of the threshold limits during the comparisons made at 68. When the environmental sensor signal does not exceed any one of its threshold limits because the environmental condition is acceptable, the determination at 70 is negative and the initial polling interval retrieved at 60 for the environmental sensor is added to the current time to arrive at a new absolute polling time and stored at 72. Upon establishing the new absolute polling time and storing the value, this particular poll of the environmental sensor is complete and the sensing and response routine 34 returns to 66 where the processor 22 (FIG. 1) polls the next environmental sensor followed by executing the actions at 68 and 70 for that next environmental sensor.

When the environmental sensor signal exceeds one of its threshold limits, the determination at 70 is affirmative and an affirmative determination can occur for either a deteriorating environmental condition or an improving environmental condition. Using the previously discussed environmental conditions to demonstrate both scenarios, the previous polling of the environmental condition indicated a high warning condition 52 (FIG. 2), for example, but the most recent polling indicated the further deterioration of the environmental condition to a high critical condition 48 (FIG. 2). Consequently, the determination at 70 is affirmative because the environmental sensor signal exceeded the high critical threshold 40 (FIG. 2). Alternatively, an improving environmental condition occurs when the previous polling of the sensor indicated a high critical condition 48 (FIG. 2), but the current polling indicates a high warning condition 52 (FIG. 2). Again, the determination at 70 is affirmative because the environmental sensor signal exceeds the high warning threshold 42 (FIG. 2). Thus, an affirmative determination at 70 is applicable to both improving and deteriorating environmental conditions.

Upon an affirmative determination at 70, the processor executes an environmental condition response at 74. For the deteriorating environmental condition, the environmental condition response includes logging the deteriorating condition, issuing a notice that a threshold limitation has been exceeded, activating alert signals, and/or increasing a fan speed to increase cooling, for example. For the improving environmental condition, the environmental condition response includes logging the improving condition, issuing a notice that the relevant environmental condition has improved, activating different alert signals, ceasing activation of the alert signals, and/or decreasing the fan speed to normal if the fan speed was previously increased, for example.

After executing the environmental condition response at 74, a subsequent determination at 76 assesses whether the environmental condition was previously detected in a previous polling of the environmental sensor. Upon an affirmative determination at 76, the existing polling interval, which had previously been adjusted for the deteriorating or improving environmental condition, is added to the current time to arrive at a new absolute polling time which is stored in memory at 78. Thereafter the process flow continues at 66.

A negative determination at 76 causes a determination at 80 to evaluate whether the current polling interval should be changed because of the recently detected improving or deteriorating environmental condition. The determination at 80 is negative under circumstances where the polling interval is not changed because, for example, the polling interval is already so short that decreasing the polling interval further would not provide any benefit and it would needlessly consume computational resources. Upon the negative determination at 80, a new absolute polling time using the existing polling interval for the environmental sensor is obtained and stored at 78. After storing the new absolute polling interval at 78, the processor 22 (FIG. 1) polls the next environmental sensor at 66 and the process flow continues from 66.

If the determination at 80 is affirmative, a new polling interval is generated for the environmental sensor at 82. In response to an improving environmental condition as made through the determination at 70, the existing polling interval for the environmental sensor is increased, thereby allowing the processor to conserve computational resources by polling the environmental sensor on a less frequent basis. Alternatively, in response to a deteriorating environmental condition as made through the determination at 70, the existing polling interval for the environmental sensor is decreased at 82. The decreased polling interval allows the processor to monitor the deteriorating environmental condition more closely through more frequent polling.

After establishing a new polling interval for the environmental sensor at 82, a new absolute polling time for the environmental sensor is obtained at 84 through the addition of the new absolute polling interval to the current time. The new absolute polling time is subsequently stored at 84 and the sensing and response routine 34 proceeds to 66 where the processor 22 polls the next environmental sensor having the next most immediate absolute polling time.

Figures 4, 5:
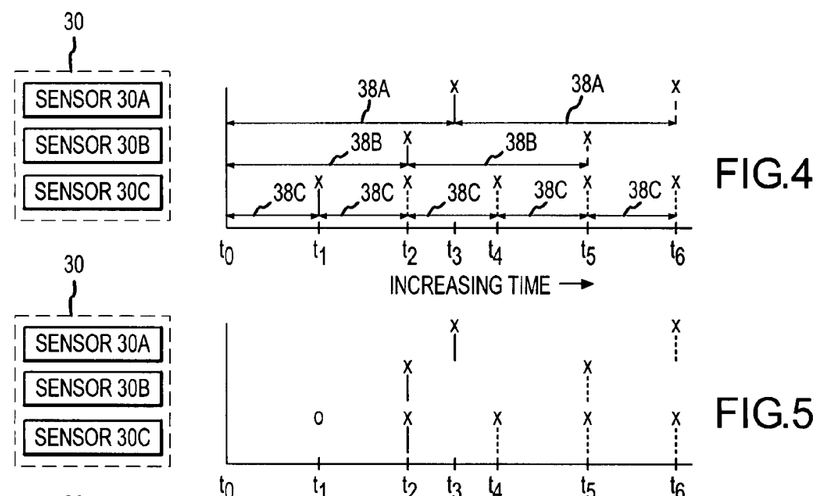
FIGS. 4-8 are graphical illustrations of the polling of the environmental sensors in relation to a common time reference, executed by the environmental sensing and response routine shown in FIG. 3.

Examples of the program flow of the environmental sensing and response routine 34, shown in FIG. 3, are described in relation to polling three environmental sensors, 30A, 30B, and 30C, as a function of time, as shown in FIGS. 4-8 (which share a common time reference). The environmental sensors 30A, 30B and 30C each possess different initial polling intervals 38A, 38B and 38C, as generally represented in FIG. 4, and these values are retrieved from memory at 60 (FIG. 3). The polling intervals 38A, 38B and 38C establish the first polling time of each environmental sensor 30A, 30B and 30C, respectively, after the initiation of the sensing and response routine 34 (FIG. 3) beginning at the current time $t_0$. To arrive at the first absolute polling time $t_3$ of the environmental sensor 30A, the current time to is added to the polling interval 38A at 62 (FIG. 3) to arrive at the first absolute polling time $t_3$ of the environmental sensor 30A, and this value is stored in memory at 64 (FIG. 3). The second polling of the environmental sensor 30A, calculated by adding the polling interval 38A to the first polling time $t_3$, is projected to be at $t_6$. However, the second polling at $t_6$ will only occur if the environmental sensor signal does not exceed the threshold at 70 (FIG. 3) and the polling interval 38A is not modified at 80 (FIG. 3). The second polling may ultimately occur at another time depending upon whether a changing environmental condition is detected through the polling of the sensor 30A at $t_3$. The projected polling time $t_6$ is used in FIG. 4 only for demonstration purposes.

In similar fashion, the steps 60, 62, and 64 (FIG. 3) are taken for the environmental sensors 30B and 30C. The polling interval 38B is added to the current time $t_0$ to establish the first absolute polling time of the environmental sensor 30B at $t_2$. The second polling of the environmental sensor 30B is calculated by adding the polling interval 30B to the first polling time $t_2$. Again, as was the case for the environmental sensor 30A, the second polling of the environmental sensor 30B will only occur as projected if its environmental sensor signal does not exceed a threshold at 70 (FIG. 3) and the polling interval 30B is not changed at 80 (FIG. 3) during the first polling. The polling interval 38C is added to the current time $t_0$ to establish the first absolute polling of the environmental sensor 38C at $t_1$. The second, third, fourth, and fifth polling times for environmental sensor 30C are calculated by successively adding the polling interval 38C to the first absolute polling time $t_1$, and these polling times are projected to occur at the times $t_2$, $t_4$, $t_5$, and $t_6$, respectively. Again, each of the polls of environmental sensor 30C subsequent to its first polling at $t_1$ will only occur as projected if each of the environmental sensor signals obtained prior to the fifth poll do not exceed a threshold at 70 (FIG. 3) and the polling interval 30C is not changed at 80 (FIG. 3) prior to the fifth poll.

The processor 22 (FIG. 1) polls the sensor with the earliest absolute polling time at 66 (FIG. 3). The environmental sensor 30C has the earliest absolute polling time at $t_1$ as shown in FIG. 5. Upon the first polling of the environmental sensor 30C at $t_1$ as indicated by the circle in FIG. 5, the environmental sensor signal received by the processor through the polling is compared to each of the sensor's threshold limits at 68 (FIG. 3), and the determination at 70 (FIG. 3) determines whether the environmental sensor signal exceeds any of its threshold limits. In this example, the polling of the environmental sensor yields an environmental sensor signal that does not exceed any threshold limits and the determination at 70 (FIG. 3) is negative. Accordingly, the time period of the polling interval 38C is not changed and the second polling of the environmental sensor 30C is obtained by adding the current time $t_1$ to the initial polling interval 38C at 72 (FIG. 3) to establish the next absolute polling time for the environmental sensor 30C at $t_2$, as projected, and is stored in memory at 72 (FIG. 3).

Figure 6:
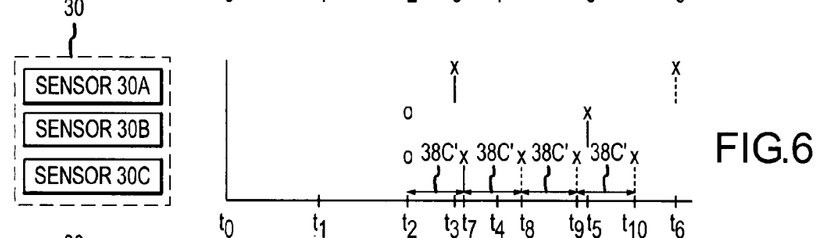

The environmental sensors 30B and 30C are polled approximately simultaneously upon the arrival of absolute time $t_2$ at 66 (FIG. 3) as indicated by the circles as shown in FIG. 6. In this example, the environmental sensor signal of environmental sensor 30B falls within its respective threshold limits as determined at 70 (FIG. 3). Thus, the polling interval 38B is not modified and the second polling of the environmental sensor 30B is calculated at 72 (FIG. 3) to occur at absolute time $t_5$, as originally projected. However, upon the second polling of the environmental sensor 30C at absolute time $t_2$, the environmental condition sensed has deteriorated as determined at 70 (FIG. 3). Accordingly, upon the affirmative determination at 70 (FIG. 3), the sensing and response routine determines at 76 (FIG. 3) that the deteriorating environmental condition has not yet been detected and the polling interval 38C is decreased at 82 (FIG. 3) so that the environmental sensor can be polled more frequently. After decreasing the polling interval 38C to arrive at a modified polling interval 38C', the current time $t_2$ is added to the modified polling interval 38C' at 84 (FIG. 3) to arrive at a new absolute polling time $t_7$ for the environmental sensor 30C which is subsequently stored in memory at 78 (FIG. 3). Thus, the environmental sensor 30C will next be polled at absolute time $t_7$ as opposed to the originally projected time of $t_4$. By successively adding the modified polling interval 38C' to the new absolute polling time $t_7$, the environmental sensor 30C is further projected to be polled at times $t_8$, $t_9$, and $t_{10}$.

Figure 7:
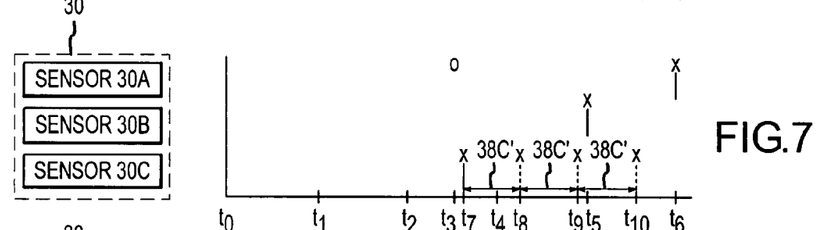

The environmental sensor 30A is polled upon the arrival of time $t_3$ at 66 (FIG. 3) as indicated by the circle as shown in FIG. 7. In this example, the environmental sensor signal of environmental sensor 30A falls within its threshold limits as determined at 70 (FIG. 3), and therefore the polling interval 38A is not modified. The next polling of the environmental sensor 30A as calculated at 72 (FIG. 3) occurs at $t_6$ as originally projected.

Figure 8:
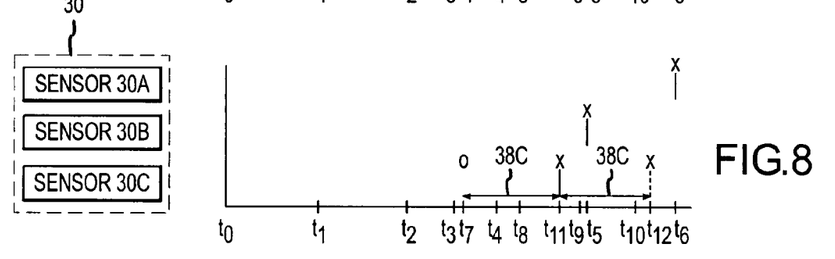

The third polling of the environmental sensor 30C occurs upon the arrival of absolute time $t_7$ at 66 (FIG. 3) as indicated by the circle as shown in FIG. 8. In this example, the environmental sensor 30C yields an environmental sensor signal which indicates that the previously deteriorating environmental condition has subsequently improved to an acceptable environmental condition. Under the improved environmental condition, the environmental sensor signal is compared to each of its thresholds at 68 (FIG. 3) and the subsequent determination at 70 (FIG. 3) is negative. Because the environmental sensor signal no longer exceeds any of its threshold limits, the modified polling interval 38C' is set to the initial polling interval 38 at 72 (FIG. 3). Using the initial polling interval 38C, the new absolute polling time is calculated at 72 (FIG. 3) to occur at $t_{11}$. Subsequent to the polling of the environmental sensor 30C at $t_{11}$, the next projected polling for this sensor is at $t_{12}$.

Using the sensing and response routine to adjust polling intervals in response to varying environmental conditions offers several advantages. The sensing and response routine allows system resources to be conserved by avoiding the unnecessary polling of environmental sensors whose environmental conditions do not require short polling intervals. In contrast, some environmental sensors monitor environmental conditions that warrant close attention, and the sensing and response routine allows these environmental sensors to be polled with longer polling intervals that are appropriate for the associated risk or consequence of failure. The sensing and response routine further allows for the polling intervals to be varied in response to changing environmental conditions. Again, the ability of the sensing and response routine to change polling intervals in response to a changing environmental condition allows system resources to be conserved or expended in relation to the environmental condition being sensed.

One advantageous use of the present invention is in a network storage server 100, shown in FIGS. 9 and 10. The network storage server 100 includes an external case or enclosure 102 within which components of the network storage server 100 are located and housed. Those components include a clock 103 (FIG. 10), at least one conventional central processing unit (CPU) or processor 104, preferably another processor 106 (FIG. 9), and a plurality of hard disk drives 108 which are connected in a conventional redundant array of independent (or inexpensive) disks or RAID configuration 109. The disk drives 108 are connected to a conventional RAID mass storage adapter 110 which is connected to the processor 104 over a data transfer bus 112, such as a PCI bus.

The processors 104 and 106 are connected to or associated with a motherboard and second motherboard 114 and 116, respectively, as shown in FIG. 9. Both processors 104 and 106 could be included on a single motherboard 114 or 116. One of the motherboards, for example motherboard 114, includes the data-transfer bus 112, such as a conventional PCI bus, to which there is connected a conventional bus device 118 (FIG. 9), such as a nonvolatile memory card, for example. The bus device 118 may contain program code and data stored in nonvolatile memory which is used to create the specific desired performance. A conventional remote LAN module (RLM) device 120 may also be also present within the enclosure 102. The RLM device 120 is used to control the functionality of the network storage server 100 from a remote location over a local area network (LAN). At least one and preferably two power supplies 122 and 124 are also located within the enclosure 102.

At least one fan 126 or blower is included in the enclosure 102 for drawing intake cooling air into an inlet vent 128 in the front panel of the enclosure 102. The cooling air flows around all of the internal components and exits through one or more outlet openings (not shown) located in a back panel of the enclosure 102. In some circumstances, the cooling air fans or blowers may be made part of the power supplies 122 and 124. In other circumstances, such a shown in FIG. 9, each cooling fan 126 is a separate component within the network storage server 100. An adequate flow of cooling air through the enclosure 102 is necessary to maintain the internal components of the network storage server 100 within acceptable thermal limits for proper operation. Although air is preferred as the cooling medium for the type of network storage server 100 described, liquid could also be employed as another cooling fluid in other types of computer units.

The internal components of the network storage server 100 are located and oriented within the enclosure 102 to achieve acceptable cooling from the internal airflow when the inlet vent 128 is not blocked to limit the intake cooling airflow and the temperature of the intake cooling air is within an acceptable range of temperature. With an adequate flow of air within an acceptable temperature range, the internal components of the network storage server 100 should not normally experience increased temperatures. However, monitoring for abnormal conditions is important to assure that the adequate cooling will actually be achieved.

At least one and preferably two conventional backplanes 130 and 132 are also present within the enclosure 102. One of the backplanes 130 or 132 is associated with each of the motherboards 114 or 116. The backplanes 130 and 132 are used to connect internal components of the network storage server 100 to the motherboards. The network storage server 100 may include other conventional and well-known internal components (not shown).

Temperature sensors are attached to and thermally associated with many of the internal components of the network storage server 100. First and second die-level integrated circuit temperature sensors 134A and 134B are associated with the processors 104 and 106, respectively. The processor temperature sensors 134A and 134B deliver signals 136A and 136B (FIG. 10) which are related to the temperatures of the processors 104 and 106, respectively.

First and second motherboard temperature sensors 134C and 134D are attached to or thermally associated with the motherboards 114 and 116, respectively. The motherboard temperature sensors 134C and 134D supply motherboard temperature signals 136C and 136D (FIG. 10) which are generally indicative of the temperature of the motherboards 114 and 116, respectively. Although the processors 104 and 106 are also attached to the motherboards 114 and 116, the temperatures of the processors 104 and 106 are generally more localized than the temperatures of the motherboards 114 and 116 and for that reason the processors usually include their own sensors 134A and 134B.

A single temperature sensor 134E is attached to or thermally associated with the bus device 118. The bus device temperature sensor 134E supplies a bus device temperature signal 136E indicative of the temperature experienced by the bus device 118. A single RLM temperature sensor 134F is associated with the RLM device 120. The RLM device temperature sensor 134F supplies a RLM temperature signal 136F (FIG. 10) which is related to the temperature of the RLM device 120 sensed by the temperature sensor 134F.

Power supply temperature sensors 134G and 134H are associated with the power supplies 122 and 124, respectively. The power supply temperature sensors 134G and 134H (FIG. 10) supply power supply temperature signals 136G and 136H (FIG. 10) which are related to the temperatures of the power supplies 122 and 124, respectively.

A front panel temperature sensor 134I is located adjacent to the inlet vent 128 or other cooling air inlet. The front panel temperature sensor 134I senses the temperature of the cooling air which enters the vent 128, and supplies a front panel temperature signal 136I (FIG. 10) representative of the temperature of the intake cooling air which enters the enclosure 102 through the inlet vent 128. The front panel temperature sensor 134I is very important in monitoring the system level cooling of the entire network storage server 100, because the temperature of the cooling air entering through the vent 128 should relate to the overall state of cooling within the network storage server 100. The temperature of the intake cooling air sensed by the front panel temperature sensor 134I represents, in a single temperature measurement, the principal indication of the expected thermal condition of all of the internal components within the computer unit.

First and second backplane temperature sensors 134J and 134K are associated with the backplanes 130 and 132, respectively. The temperature sensors 134J and 134K sense the temperatures of the backplanes 130 and 132 and supply backplane temperature sensor signals 136J and 136K (FIG. 10) which are related to the temperatures of the backplanes 130 and 132, respectively. In some cases, the backplane temperature sensors 134J and 134K (FIG. 10) may be eliminated in favor of the motherboard temperature sensors 134C and 134D, or alternatively, the backplane temperature sensors 134J and 134K (FIG. 10) may be used instead of the motherboard temperature sensors 134C and 134D. These alternative arrangements are permitted because the backplanes are generally closely associated with the motherboards and will generally represent temperatures similar to the temperatures of the motherboards.

Disk drive temperature sensors 134L are associated with each of the disk drives 108. The disk drive temperature sensors 134L supply disk drive temperature sensor signals 136L which are related to the temperatures of the disk drives 108.

Voltage sensors are distributed throughout the network storage server 100 to sense the environmental voltages of certain electrical components. Processor voltage sensors 138A and 138B are associated with the processors 104 and 106, respectively. The voltage sensors 138A and 138B deliver voltage signals 140A and 140B (FIG. 10) which are related to the voltage levels supplied to the processors 104 and 106, respectively. Power supply voltage sensors 138C and 138D are associated with the power supplies 122 and 124, respectively. The power supply voltage sensors 138C and 138D deliver voltage signals 140C and 140D (FIG. 10) which are related to the voltage levels supplied by the power supplies 122 and 124, respectively. Other voltage sensors can be included within the network storage server 100 for other electrical components whose proper voltage level is required for the continued operation of the network storage server 100.

Each of the fans 126 within the enclosure 102 has a fan speed sensor 142 for detecting the speed of its associated fan 104 to ensure that each fan is operating at a sufficient speed to conduct enough environmental cooling air. The plurality of fan speed sensors 142 each produce a respective fan speed signal 144A, B, . . . N (FIG. 10).

The network storage server 100 includes a local bus 148 which connects a system memory 150 to the processor 104, as shown in FIG. 10. The data-transfer bus 112 allows access to the peripheral devices, such as the disk drives 108 in the RAID configuration 109. The memory 150 includes recorded code which defines a storage operating system 152 that causes the network storage server 100 to operate as a storage server for the management of large amounts of data storage stored on the disk drives 108 in the RAID configuration 109.

Other environmental sensors 154 supply signals 156 in the same manner as the previously described sensors supply their signals. The other environmental sensors 154 are used in accordance with the present invention in the same manner as the previously described temperature sensors 134A-N, voltage sensors 138A-N and fan sensors 142A-N. The environmental sensors 30 therefore represent all of the temperature sensors 134A, B, . . . , N, all of the voltage sensors 138A, B, . . . , N, and all of the fan speed sensors 142A, B, . . . , N, and all of the other environmental sensors 154 within the network storage server 100.

The program code for the sensing and response routine 34 may be implemented as independent code recorded in the memory 150, or preferably, the sensing and response routine 34 is incorporated into and as a part of the storage operating system 152 code. An example of a storage operating system is Data ONTAP® of Network Appliance, Inc. (Sunnyvale, Calif.), the assignee of the present invention. Data ONTAP® is capable of implementing and controlling large-scale or enterprise storage servers, such as a fabric-attached storage (FAS) system exemplified by the FAS6000 series of products from Network Appliance, Inc. The sensing and response routine 34 may be incorporated into Data ONTAP® on such products. Although examples of the invention have been described here with respect to the commercial products of Network Appliance, the present invention is applicable to any computer system in which it is desirable to sense and monitor environmental conditions.

Examples of the relationship between the thresholds (FIG. 2) and environmental conditions to which those thresholds relate for the network storage server 100 (FIGS. 9 and 10) are as follows. In regard to the processor temperature sensor 134A for the processor 104, the acceptable environmental condition 56 (FIG. 2) for the processor 104 is defined by the high warning threshold 42 (FIG. 2) of 40° C. and the low warning threshold 44 (FIG. 2) of 10° C. The high critical threshold 40 (FIG. 2) is established at 50° C. and the low critical threshold 46 (FIG. 2) is established at 0° C. While the processor 104 operates under an acceptable environmental condition 56 (FIG. 2), the polling interval of the temperature sensor 134A is relatively large, such as one minute. If the temperature sensor 134A senses that the temperature associated with the processor 104 rises to a temperature that falls between the range of 40-50° C., a high warning condition 52 (FIG. 2) exists and the polling interval is decreased, such as to an interval of 30 seconds. If the temperature continues to rise to a temperature above 50° C., then a high critical condition 48 (FIG. 2) exists and the polling interval is decreased even further, such as to an interval of 10 seconds. The operation of the processor 104 may thereafter be terminated if the temperature continues to rise, to allow the processor to cool so as to avoid destroying itself. Under such circumstances, a system message is issued to alert the system administrator of the problem.

On the other hand, if the temperature sensor 134A senses that the temperature has fallen below the high critical threshold 40 (FIG. 2) of 50° C., the polling interval is reestablished as 30 seconds. Upon a further decrease in temperature below the high warning threshold 42 (FIG. 2) of 40° C., the polling interval is reestablished as one minute to conserve system resources by avoiding unnecessary polling. Upon the temperature falling beneath each of the thresholds 40 and 42, the system administrator is notified of the improvement of the environmental condition.

A further example of the relationship between the thresholds and environmental conditions involves the voltage sensors which sense the voltage levels of the digital logic electrical components. To operate correctly, the voltage levels of the digital components must be maintained at appropriate voltage levels. One such example involves the voltage sensor 138A for the processor 104. For example, the normal operating voltage of the processor 104 is about 3.3 V. The processor 104 begins to malfunction if its supplied voltage falls. To sense undesired voltage drops, and thereby protect the processor 104, the low warning threshold 44 (FIG. 2) of the voltage sensor 138A is established at 3.0 V, and the low critical warning threshold 46 (FIG. 2) is established at 2.0 V. Upon the voltage sensor 138A detecting a voltage below the low warning threshold 44 (FIG. 2) of 3.0 V, a warning message is delivered to the administrator and the polling interval is decreased, such as from a minute down to 15 seconds. If the voltage continues to fall and the voltage sensor 146 ultimately detects a voltage below 2.0 V, the operation of the processor 104 is susceptible to malfunctioning and its operation terminated. The system administrator is notified of the suspension of operation to enable the problem to be remedied.

Another example involves the fan speed sensor 142A for one of the fans 126 which is used to draw air through the vent 128 to cool the heat generating components of the network storage server 100. Each of the fans 126 is an example of a less critical element whose polling interval can be substantially greater than the polling intervals of the more critical components of the system, such as the processor 104 whose temperature and voltage are monitored more closely by the temperature and voltage sensors 134A and 138A as just described. For example, the polling interval of the fan 126 may be set to 10 minutes, and the low warning threshold 44 (FIG. 2) and the low critical threshold 46 (FIG. 2) are set to predetermined fan speeds (e.g., in revolutions per minute). The predetermined fan speeds established for the thresholds 44 (FIG. 2) and 46 (FIG. 2) are values at which one fan 126 becomes incapable of conducting enough cooling air for the entire network storage server 100. In the event the fan speed slows and either of the thresholds 44 (FIG. 2) and 46 (FIG. 2) are exceeded, a warning message is generated for the system administrator.

Thus, in the manner described, the incorporation of the present invention in the network storage server 100 achieves all of the advantages and improvements previously discussed in connection with the general form of the invention described in connection with FIGS. 1-8.

The significance of the previously discussed and other improvements and advantages will become apparent upon gaining a full appreciation of the ramifications and improvements of the present invention. Preferred embodiments of the invention and many of its improvements have been described with a degree of particularity. The description is of preferred examples of implementing the invention, and the description is not necessarily intended to limit the scope of the invention. The scope of the invention is defined by the following claims.

The invention claimed is:

1. A method for sensing environmental conditions of a computer system having a plurality of environmental sensors distributed at locations throughout the computer system, comprising:

sensing environmental conditions of the computer system at the location of each sensor;

generating a sensor signal indicating the environmental condition sensed by each sensor;

polling each sensor at a polling time interval to obtain the sensor signal from each sensor polled; wherein the polling comprises:

obtaining a current time;

adding the polling time interval for each sensor to the current time to establish an absolute polling time for each sensor;

polling each sensor at its absolute polling time;

polling the plurality of sensors in a sequence established by their absolute polling times; and
establishing unequal polling time intervals for at least two sensors.

2. A method as defined in claim 1, further comprising:
adjusting the polling time interval of at least one of the two sensors in response to the one sensor sensing a changed environmental condition.

3. A method as defined in claim 2, further comprising:
decreasing the polling time interval of the one sensor in response to a deterioration of the environmental condition sensed by the one sensor; and
increasing the polling time interval of the one sensor in response to an improvement of the environmental condition sensed by the one sensor.

4. A method as defined in claim 2, further comprising:
responding to the changed environmental condition by executing an environmental condition response in response to the changed environmental condition.

5. A method as defined in claim 4, further comprising:
monitoring temperature as the environmental condition at the location of the one sensor; and
executing the environmental condition response by increasing cooling at the location adjacent to the one sensor.

6. A method as defined in claim 2, further comprising:
establishing a threshold limit which defines two different states of the environmental condition at the location of the one sensor;
comparing the sensor signal of the one sensor to the threshold limit; and
adjusting the polling time interval of the one sensor based on a transition of the sensor signal of the one sensor relative to the threshold limit.

7. A method as defined in claim 6, further comprising:
executing an environmental condition response in response to the transition of the sensor signal relative to the threshold limit.

8. A method as defined in claim 7, further comprising:
monitoring temperature as the environmental condition at the location of the one sensor.

9. A method as defined in claim 2, further comprising:
establishing a plurality of threshold limits which define at least three different states of the environmental condition at the location of the one sensor;
comparing the sensor signal of the one sensor to the plurality of threshold limits;
adjusting the polling time interval of the one sensor based on each transition of the sensor signal of the one sensor relative to each threshold limit; and
executing an environmental condition response in response to the transition of the sensor signal relative to each threshold limit.

10. A method as defined in claim 2, further comprising:
making any adjustment of the polling time interval of each sensor immediately after polling the sensor.

11. A computer system, comprising:
a plurality of environmental sensors distributed at locations for sensing environmental conditions at the location of the sensors within the computer system, each sensor supplying a sensor signal indicating the environmental condition sensed by each sensor; and
a processor executing programmed instructions to poll each sensor at a polling time interval to obtain the sensor signal from each sensor polled and to establish unequal polling time intervals for at least two sensors; and wherein:

the processor executes programmed instructions to poll each of the sensors at an absolute polling time, to add the polling time interval of each sensor to a current time to establish the absolute polling time for each sensor, and to poll the plurality of sensors in a sequence established by the absolute polling times of the plurality of sensors.

12. A computer system as defined in claim 11, further comprising:
a memory containing information which defines a threshold limit which defines two different states of the environmental condition at the location of at least one of the two sensors; and wherein:
the processor executes programmed instructions to compare the sensor signal from the one sensor to the threshold limit for the one sensor, and to adjust the polling time interval of the one sensor based on a transition of the sensor signal from the one sensor relative to the threshold limit.

13. A computer system as defined in claim 12, wherein:
the processor executes programmed instructions to decrease the polling time interval of the one sensor in response to a transition of the sensor signal from the one sensor from below the threshold limit to above the threshold limit, and to increase the polling time interval of the one sensor in response to a transition of the sensor signal from the one sensor from above the threshold limit to below the threshold limit.

14. A computer system as defined in claim 12, wherein:
the processor executes programmed instructions to perform an environmental condition response in response to the transition of the sensor signal relative to the threshold limit.

15. A computer system as defined in claim 14, wherein the one sensor monitors temperature as the environmental condition at the location of the one sensor.

16. A computer system as defined in claim 15, wherein the environmental condition response includes increasing cooling at the location adjacent to the one sensor.

17. A computer system as defined in claim 12, wherein:
the memory contains information which defines a plurality of threshold limits which define at least three different states of the environmental condition at the location of the one sensor; and
the processor executes programmed instructions to compare the sensor signal from the one sensor to the plurality of threshold limits, to adjust the polling time interval of the one sensor based on each transition of the sensor signal of the one sensor relative to each threshold limit, and to execute an environmental condition response in response to the transition of the sensor signal of the one sensor relative to each threshold limit.

18. A computer system as defined in claim 11, wherein:
the processor executes programmed instructions to make any adjustment of the polling time interval of each sensor immediately after polling the sensor.

19. A computer system as defined in claim 11, wherein:
the computer system is a storage server with a plurality of mass data storage devices for mass data storage.

20. A computer system as defined in claim 19, wherein:
at least one of the environmental sensors is a temperature sensor which senses environmental temperature at one of a location or a component within the storage server.

21. A computer system as defined in claim 19, wherein:
at least one of the environmental sensors is a voltage sensor which senses environmental voltage at a digital electronic component of the storage server.

22. A computer system as defined in claim 19, wherein:
at least one of the environmental sensors is a speed sensor of a cooling air fan of the storage server.

23. A computer system as defined in claim 19, wherein:
the storage server includes a memory containing code defining a storage operating system which performs mass data storage operations; and
the storage operating system includes the programmed instructions to poll each sensor at a polling time interval and to establish unequal polling time intervals for at least two sensors.

24. A method as defined in claim 1, wherein the computer system constitutes a storage server having a memory and a plurality of mass data storage devices for mass data storage, further comprising:
containing code within the memory which defines a storage operating system by which to perform mass data storage operations on the plurality of mass data storage devices;
including programmed instructions within the code of the storage operating system to poll each sensor at a polling time interval and to establish unequal polling time intervals for at least two sensors; and
polling each sensor at a polling time interval to obtain the sensor signal from each sensor polled by executing the programmed instructions of the storage operating system; and
establishing unequal polling time intervals for at least two sensors by executing the programmed instructions of the storage operating system.

25. A method for sensing environmental conditions of a computer system having a plurality of environmental sensors distributed at locations throughout the computer system, the computer system constituting a storage server having a memory and a plurality of mass data storage devices for mass data storage, the method comprising:
containing code within the memory which defines a storage operating system by which to perform mass data storage operations on the plurality of mass data storage devices;
sensing environmental conditions of the computer system at the location of each sensor;
generating a sensor signal indicating the environmental condition sensed by each sensor;
including programmed instructions within the code of the storage operating system to poll each sensor at a polling time interval;
polling each sensor at a polling time interval to obtain the sensor signal from each sensor polled by executing the programmed instructions of the storage operating system; and
establishing unequal polling time intervals for at least two sensors by executing the programmed instructions of the storage operating system.

26. A method as defined in claim 25, further comprising:
adjusting the polling time interval of at least one sensor in response to the one sensor sensing a changed environmental condition.

27. A method as defined in claim 26, further comprising:
decreasing the polling time interval of the one sensor in response to a deterioration of the environmental condition sensed by the one sensor; and
increasing the polling time interval of the one sensor in response to an improvement of the environmental condition sensed by the one sensor.

28. A method as defined in claim 26, further comprising:
responding to the changed environmental condition by executing an environmental condition response in response to the changed environmental condition.

29. A method as defined in claim 26, further comprising:
establishing a threshold limit which defines two different states of the environmental condition at the location of the one sensor;
comparing the sensor signal of the one sensor to the threshold limit; and
adjusting the polling time interval of the one sensor based on a transition of the sensor signal of the one sensor relative to the threshold limit.

30. A method as defined in claim 29, further comprising:
executing an environmental condition response in response to the transition of the sensor signal of the one sensor relative to the threshold limit.

31. A method as defined in claim 26, further comprising:
establishing a plurality of threshold limits which define at least three different states of the environmental condition at the location of the one sensor;
comparing the sensor signal of the one sensor to the plurality of threshold limits;
adjusting the polling time interval of the one sensor based on each transition of the sensor signal of the one sensor relative to each threshold limit; and
executing an environmental condition response in response to the transition of the sensor signal of the one sensor relative to each threshold limit.

32. A computer system, comprising:
a plurality of environmental sensors distributed at locations within the computer system for the sensing of environmental conditions at the location of the sensors, each sensor supplying a sensor signal indicating the environmental condition sensed by each sensor; and
a processor executing programmed instructions to poll each sensor at a polling time interval to obtain the sensor signal from each sensor polled and to establish unequal polling time intervals for at least two sensors; and wherein:
the computer system comprises a storage server with a plurality of mass data storage devices for mass data storage;
the storage server includes a memory containing code defining a storage operating system which performs mass data storage operations on the plurality of mass data storage devices; and
the storage operating system includes the programmed instructions to poll each sensor at a polling time interval and to establish unequal polling time intervals for at least two sensors.

33. A computer system as defined in claim 32, wherein:
the processor executes programmed instructions to adjust the polling time interval of at least one sensor in response to the one sensor sensing a changed environmental condition.

34. A computer system as defined in claim 33, wherein:
the processor executes programmed instructions to decrease the polling time interval of the one sensor in response to a deterioration of the environmental condition sensed by the one sensor, and to increase the polling time interval of the one sensor in response to an improvement of the environmental condition sensed by the one sensor.

35. A computer system as defined in claim 33, wherein:

the processor executes programmed instructions to perform an environmental condition response in response to the changed environmental condition.

36. A computer system as defined in claim 33, wherein:

the memory contains information which defines a threshold limit which defines two different states of the environmental condition at the location of the one sensor; and the processor executes programmed instructions to compare the sensor signal from the one sensor to the threshold limit for the one sensor, and to adjust the polling time interval of the one sensor based on a transition of the sensor signal from the one sensor relative to the threshold limit.

37. A computer system as defined in claim 36, wherein:

the processor executes programmed instructions to perform an environmental condition response in response to the transition of the sensor signal relative to the threshold limit.

38. A computer system as defined in claim 33, wherein:

the memory contains information which defines a plurality of threshold limits which define at least three different states of the environmental condition at the location of the one sensor; and the processor executes programmed instructions to compare the sensor signal from the one sensor to the plurality of threshold limits, to adjust the polling time interval of the one sensor based on each transition of the sensor signal of the one sensor relative to each threshold limit, and to execute an environmental condition response in response to the transition of the sensor signal of the one sensor relative to each threshold limit.

* * * * *